(12) United States Patent
Schwartz

(10) Patent No.: US 11,087,373 B2
(45) Date of Patent: *Aug. 10, 2021

(54) EMBEDDED RETAIL SYSTEM

(71) Applicant: International Business Machines Corporation, Armonk, NY (US)

(72) Inventor: Robyn R. Schwartz, Deerfield, IL (US)

(73) Assignee: International Business Machines Corporation, Armonk, NY (US)

( * ) Notice: Subject to any disclaimer, the term of this patent is extended or adjusted under 35 U.S.C. 154(b) by 120 days.

This patent is subject to a terminal disclaimer.

(21) Appl. No.: 16/440,300

(22) Filed: Jun. 13, 2019

(65) Prior Publication Data

US 2019/0295138 A1    Sep. 26, 2019

Related U.S. Application Data

(63) Continuation of application No. 14/590,458, filed on Jan. 6, 2015, now Pat. No. 10,373,220.

(51) Int. Cl.
*G06Q 30/06* (2012.01)
(52) U.S. Cl.
CPC ................ *G06Q 30/0601* (2013.01)
(58) Field of Classification Search
CPC ................................. G06Q 30/06–08
See application file for complete search history.

(56) References Cited

U.S. PATENT DOCUMENTS

| 8,065,200 | B2 | 11/2011 | Schwartz |
| 8,253,727 | B2 | 8/2012 | Schwartz |
| 2005/0203784 | A1 | 9/2005 | Rackham |
| 2012/0150692 | A1 | 6/2012 | Dueck et al. |
| 2013/0325701 | A1 | 12/2013 | Schwartz |

OTHER PUBLICATIONS

Morgan Stanley, "Mobile Payments: The Coming Battle for the Wallet", Jan. 8, 2014, 1 page.
TSYS 2013 Consumer Payment Choice Study, 20 pages.
(Continued)

*Primary Examiner* — Ming Shui
(74) *Attorney, Agent, or Firm* — Schmeiser, Olsen & Watts, LLP; Nicholas L. Cadmus

(57) ABSTRACT

A system and associated method. The system includes a server computer and an integration and dis-integration engine coupled to the server computer. The server computer provides a structure in which the components are integrated via dynamic application programming interface (API) integration. Multiple components are sequenced in a predefined sequential order. A function to be performed is respectively associated with each component. The server computer and the integration and dis-integration engine provide a technology environment that dynamically integrates technology enabled business processes that dynamically, electronically and automatically enter and leave the components integrated in the structure provided by the server computer. The technology enabled business processes are dynamically integrated during implementation of a retail sale of a product to a customer in a de-centralized manner to perform, in the predefined sequential order of the components, all of the functions respectively associated with the components.

12 Claims, 3 Drawing Sheets

(56) References Cited

OTHER PUBLICATIONS

Schwartz, Robyn R., "Isolated Payment System", U.S. Appl. No. 14/454,361, filed Aug. 7, 2014.
Office Action (dated Sep. 21, 2017) for U.S. Appl. No. 14/590,458, filed Jan. 6, 2015.
Office Action (dated Dec. 21, 2017) for U.S. Appl. No. 14/590,458, filed Jan. 6, 2015.
Final Office Action (dated Apr. 19, 2018) for U.S. Appl. No. 14/590,458, filed Jan. 6, 2015.
Final amendment (dated Jun. 18, 2018) for U.S. Appl. No. 14/590,458, filed Jan. 6, 2015.
Advisory action (dated Jul. 5, 2018) for U.S. Appl. No. 14/590,458, filed Jan. 6, 2015.
Amendment and RCE (dated Jul. 17, 2018) for U.S. Appl. No. 14/590,458, filed Jan. 6, 2015.
Office Action (dated Nov. 20, 2018) for U.S. Appl. No. 14/590,458, filed Jan. 6, 2015.
Amendment (dated Feb. 20, 2019) for U.S. Appl. No. 14/590,458, filed Jan. 6, 2015.
Notice of Allowance (dated Mar. 25, 2019) for U.S. Appl. No. 14/590,458, filed Jan. 6, 2015.

EMBEDDED RETAIL SYSTEM

This application is a continuation application claiming priority to Ser. No. 14/590,458, filed Jan. 6, 2015, now U.S. Pat. No. 10,373,220, issued Aug. 6, 2019.

BACKGROUND OF THE INVENTION

Field of the Invention

The invention relates to systems for retail sales of merchandise. More specifically, the invention relates to a system for a plurality of companies (or entities) to dynamically enter and leave a component of the system. The system further manages a smooth interaction between components all the while to provide a seamless transparent experience to the customer while recording participating business entity based on role and participation inside of the process.

BRIEF SUMMARY OF THE INVENTION

An embedded retail system is the experience of fully embedding all core experiences of the horizontal retailing experience separately into the weave of social fabric where each process is component-based and can be fulfilled by separate business entities in a dynamic and opportunistic fashion defined by situational parameters (availability, logistics, cost to deliver) and customer preferences (preferred providers, best offer, best fit). It can be likened to group-sourcing models for inspiration, instigation through completion, and distribution of a retail process. This process further leverages the horizontal or dynamically collaborative experience of retailing from a business process perspective. The in-store experience continues to have a fulfillment and edutainment aspect, but retailers can lower holding costs due to inventory as they move more towards the embedded model. Their focus continues to shift to customer experience management and customer ownership of their own experience.

New and emerging technologies enable this kind of dynamic and autonomic business model through cloud, foundry and orchestration type technologies. These technologies enable leverage of available frameworks and ability to dynamically aggregate services on demand and then dissipate or "go-away" or dis-integration. The critical factor is in automation or orchestration to enable the dynamic assembly of disparate businesses and services to be able to act in synch to support a given transaction of record. The system is able to reassemble on demand and track assembly for accountability. The system holds the template of the model for future transactions, as well. Each entity virtually understands the resources and terms of interaction for a given dynamic transaction and applied rules force transparency for data sharing.

DETAILED DESCRIPTION

For a better understanding of the present invention, together with other and further objects, advantages, and capabilities thereof, reference is made to the following disclosure and the appended claims in connection with the above-described drawings.

Figure 1:
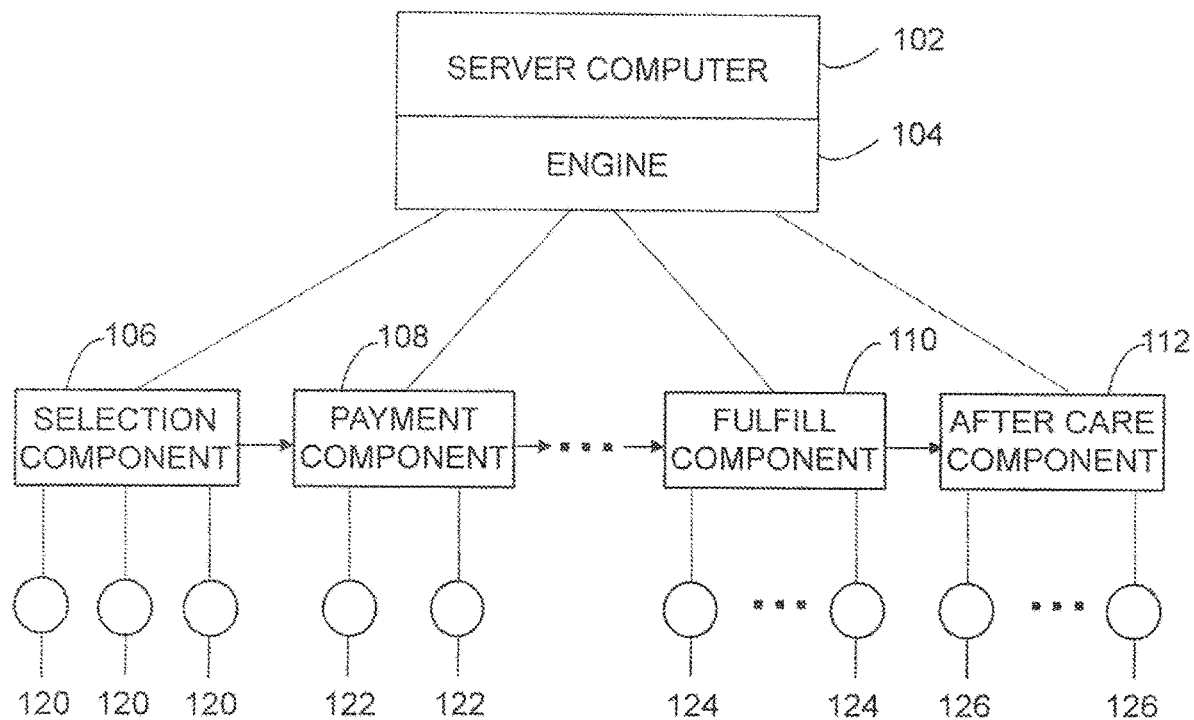
FIG. 1 is a block diagram of an embedded retail system in accordance with the present invention.

In FIG. 1, there is shown a block diagram of an embedded retail system in accordance with one embodiment of the present invention. Server computer 102 provides a horizontal structure for integration of retail components 106, 108, through 110, 112. The structure is shown as horizontal because that is the natural left to right flow as a customer proceeds through a retail purchasing experience. Components 106-112 operate independently but are coordinated by server computer 102. Although FIG. 1 shows components for product selection-106, payment-108, fulfillment-110, and after care-112, other components may be present at any point in the horizontal structure such as denoted by the three dots . . . (ellipses) in FIG. 1 between components 108 and 110. Components may be as described in US Patent Publication US2005/0203784 by Rackham, which shall be incorporated herein by reference, in its entirety for any purpose. For example, shipping may be included in fulfill component 110, or alternatively a separate shipping component (not shown) may be included in the horizontal structure by server computer 102. A payment component may comprise a system as described in application Ser. No. 14/454,361, filed Aug. 7, 2014, which shall be incorporated herein by reference, in its entirety for any purpose.

A consumer may opt to purchase something direct through a social electronic environment (e.g., a social website either through direct or embedded access, such as through a media portal or opportunity viewing). A consumer upon deciding to buy a given product may want to select or outsource the payment option or transaction to some other provider who will then provide the remit back to the seller. Post-transaction, the buyer may want to select a specific fulfillment or distribution provider based on "best fit" options (price, logistics, timing, etc.). The after-care service can also be selected in conjunction with or separate from the other retail processes.

However the components are structured, these collectively are capable of performing a retail sale of a product to a customer. As noted above, the customer may use a component at one time, pause, and then proceed horizontally to the next component on whatever personal schedule is desired. The customer may go back (left) one or more components, if desired, before proceeding horizontally to the right without departing from the present invention.

The horizontal structure of FIG. 1 may be embedded within a social network, thereby providing all of the features of the social network seamlessly to the customer. For example, the customer may use social networking to evaluate others' experience with the product, or to validate product quality.

A plurality of separate businesses provide the function of each component. For example, businesses 120 provide the selection component function. Businesses 122 provide payment. Businesses 124 provide fulfillment. Businesses 126 provide after care.

Integration and dis-integration engine 104 allows a business to automatically enter a component as a provider or leave in a dynamic, opportunistically and on-demand manner which is transparent to the customer. The entity identification includes gateway acknowledgement of restrictions and requirements as applicable to participate in the given transaction event. The businesses are typically independent disparate enterprise entities who desire to provide that component or which they have a particular advantage. A business may also at any point in time provide more than one component if so entered using integration engine 104.

The present invention is a realization that the more embedded or ingrained or normalized the transaction experience becomes in our everyday event experiences (walking down the street, surfing the web, eating dinner, at a public park) and as technology enables the fully componentization of core business process events across the experience cycle—the greater the opportunity to leverage technology to opportunistically and dynamically create an integrated horizontal experience across varied business provider entities that may have pre-existing relationships that define their collaboration in support of a retail experience. Each business entity pre-defines parameters that support their best revenue interests both transactional and long-term for either or both the consumer or business relationship. This flattened component-based process opens up the field equally for traditional and non-traditional business entities.

The present invention based on a fully de-centralized componentized retailing experience where core business process components are segregated into holistic units. By example, a consumer may conduct product research and browse through a provider such as Google (Google is a trademark of Google, Inc., of Mountain View, Calif.) or some other search agent. A consumer may validate product quality or "fit" through peer social ecosystems. A consumer may purchase product through a social portal or from a retailer who may represent multiple (or a single) vendor or manufacturer. The transaction component may be conducted through a separate provider such as PayPal (PayPal is a trademark of PayPal, Inc. of San Jose, Calif.), mobile wallet provider Lemon, or others. Fulfillment may be completed via a dedicated service like UPS or other. After care may be offered as a service through another entity such as the manufacturer or even a non-manufacturer contracted service agent. Each of the businesses therefore can play to their core strengths and wield their unique brand profile in terms of what they offer.

The present invention offers consumers multiple models that can effect revenue models for the providers. Two such examples might include all-in-one pricing where all component provider fees are integrated into the single consumer-facing price, or consumers may choose to toggle across providers to manage pricing opportunity as could be impacted by elements of the process; e.g., product availability, product proximity relative to delivery or delivery or product transfer cost (especially in the case of pick-up options).

A critical success factor provided by the present invention is the ability for business provider entities to be able to dynamically and opportunistically at the point of demand be able to integrate into a holistic horizontal provider suite enabled to meet the consumer request from interest through fulfillment. Research and browse may be able to be held separate, dependent on the event and preference. This is the same for after-care services. After-care services may be integrated dynamically in an elongated horizontal retail ecosystem. This is dependent on the crafted opportunity and on the customer preference-more than likely as impacted by the current purchase.

The present invention has the ability for business provider entities across the demands of a fully functioning horizontal ecosystem to be able to come together on demand in an integrated seamless customer and business experience. The technology environment is able to enable dynamic integration of technology enabled business process components across: interest generation/creation>>research/browse>>product qualification/review & assessment>>product selection>>product purchase/transaction>>fulfillment/delivery>>after-care services. Each operating business entity (without regard for relative size or representation) is able to see relevant parts of the horizontal experience and respond and deliver accordingly. Each entity is able to be compensated according to pre-defined business rules. Each entity is identified for accountability for relevant business process points of action and interaction.

The present invention has opportunistic integration of unique components. This can be accomplished using dynamic API (Application programming interface) integration. The opportunity described herein offers opportunity for multiple businesses to participate in support and profit from consumer/business transactions. Accountability is tied to each process component, such that product accountability is held separate from transaction or fulfillment accountability. Given positive consumer experiences, individuals may choose certain dynamic ecosystems to fulfill their transactions providing incentive for a leveled playing field to be able to accommodate individual preferences.

Figure 2:
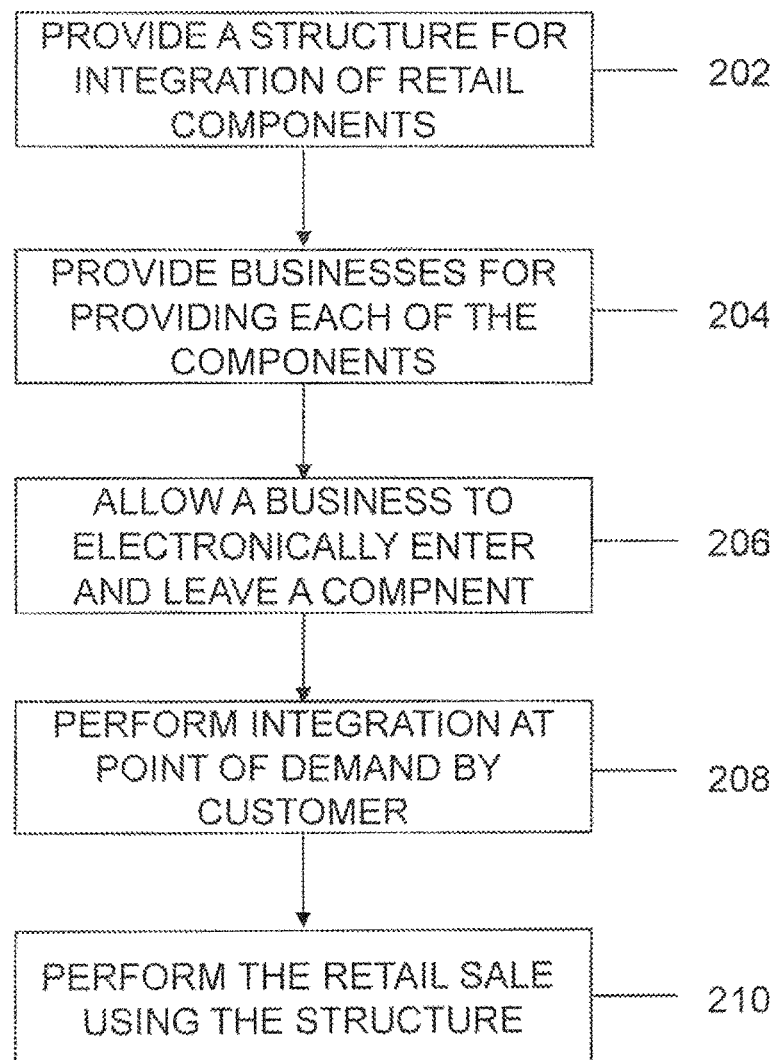
FIG. 2 is a flowchart of steps performed in carrying out the process of the present invention.

In FIG. 2, there is shown a flowchart of steps to be performed in practicing an embodiment of the present invention. In step 202, a structure for integration of retail components is provided. The structure is provided by a server computer, such as server computer 102 of FIG. 1.

In step 204, a plurality of businesses provide each of the components in the structure of step 202.

In step 206, a business is allowed to electronically enter or leave a component. The business performs the function of the specific component.

In step 208, the components are integrated on demand by the customer. The integration is dynamic and opportunistic as described above.

In step 210, a retail sale is collectively performed for a customer using the structure of step 202.

Figure 3:
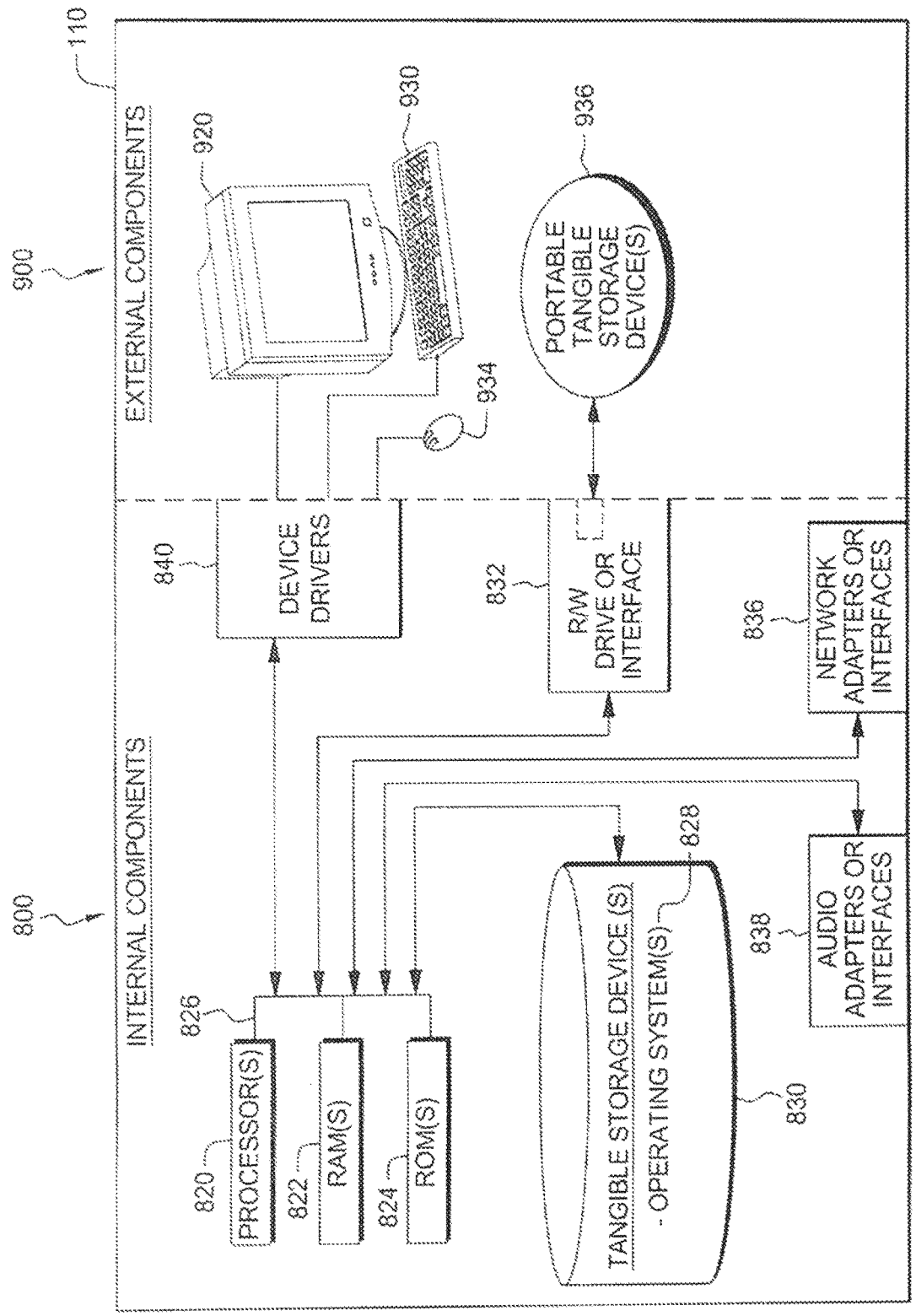
FIG. 3 is a system diagram of a computer hardware and software product for use in implementing portions of the present invention.

FIG. 3 shows a block diagram of internal components 800 and external components 900 of a computer 102, in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Computer 102 is representative of any electronic device capable of executing machine-readable program instructions. Computer 102 may be representative of a computer system or other electronic devices. Examples of computing systems, environments, and/or configurations that may be represented by computer 102 include, but are not limited to, personal computer systems, server computer systems, thin clients, thick clients, laptop devices, smart phones, multi-processor systems, microprocessor-based systems, network PCs, minicomputer systems, and distributed cloud computing environments that include any of the above systems or devices.

Computer 102 includes a set of internal components 800 and external components 900. Internal components 800 includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, functions in computer device 110 are stored on one or more of the respective computer-readable tangible storage devices 830 for execution by one or more of the respective processors 820 via one or more of the respective RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Internal components 800 also includes a R/W drive or interface 832 to read from and write to one or more portable computer-readable tangible storage devices 936 such as a CD-ROM, DVD, memory stick, magnetic tape, magnetic disk, optical disk or semiconductor storage device. Functions in computer 102 can be stored on one or more of the respective portable computer-readable tangible storage devices 936, read via the respective R/W drive or interface 832 and loaded into the respective hard drive 830.

Internal components 800 also includes audio adapters or interfaces 838, such as a sound card, hardware mixer, amplifier, or other adapters or interfaces for receiving audio signals from microphones.

Internal components 800 also includes network adapters or interfaces 836 such as a TCP/IP adapter cards, wireless Wi-Fi interface cards, or 3G or 4G wireless interface cards or other wired or wireless communication links. Functions in computer 102 can be downloaded to computer 102 from an external computer via a network (for example, the Internet, Cloud 24, a local area network or other, wide area network) and respective network adapters or interfaces 836. From the network adapters or interfaces 836. The network may comprise copper wires, optical fibers, wireless transmission, routers, firewalls, switches, gateway computers and/or edge servers.

External components 900 can include a computer display monitor 920, a keyboard 930, and a computer mouse 934. External components 900 can also include touch screens, virtual keyboards, touch pads, pointing devices, and other human interface devices. Internal components 800 includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Aspects of the present invention have been described with respect to block diagrams and/or flowchart illustrations of methods, apparatus (system), and computer program products according to embodiments of the invention. It will be understood that each block of the flowchart illustrations and/or block diagrams, and combinations of blocks in the flowchart illustrations and/or block diagrams, can be implemented by computer instructions. These computer instructions may be provided to a processor of a general purpose computer, special purpose computer, or other programmable data processing apparatus to produce a machine, such that instructions, which execute via the processor of the computer or other programmable data processing apparatus, create means for implementing the functions/acts specified in the flowchart and/or block diagram block or blocks.

The aforementioned programs can be written in any combination of one or more programming languages, including low-level, high-level, object-oriented or non object-oriented languages, such as Java, Smalltalk, C, and C++. The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet service provider). Alternatively, the functions of the aforementioned programs can be implemented in whole or in part by computer circuits and other hardware (not shown).

In some embodiments of the present invention, a processor, as described in connection with FIG. 3 may be included in server computer 102 or integration engine 104 or components 106-112 of FIG. 1. The computer of FIG. 3 may also be used to implement the steps of FIG. 2.

While there have been shown and described what are at present considered the preferred embodiment of the invention, it will be obvious to those skilled in the art that various changes and modifications may be made therein without departing from the scope of the invention as defined by the appended claims.

What is claimed is:

1. A system, said system comprising:
   a server computer providing a structure in which the components are integrated via dynamic application programming interface (API) integration, wherein a plurality of components are sequenced in a predefined sequential order, wherein a function to be performed is respectively associated with each component, wherein a plurality of businesses are independent and disparate with respect to each other, wherein performance of all of the functions respectively associated with the components collectively implements a retail sale of a product to a customer in a de-centralized manner via each function respectively associated with each component being performed by a unique business of the plurality of businesses, wherein the plurality of components are coordinated by server computer, and wherein performance, in the predefined sequential order of the components, of all of the functions respectively associated with the components implements the retail sale of the product to the customer; and
   an integration and dis-integration engine coupled to the server computer,
   wherein the server computer and the integration and dis-integration engine provide a technology environment that dynamically integrates technology enabled business processes of the businesses that dynamically, electronically and automatically enter and leave the components integrated in the structure provided by the server computer, and
   wherein the technology enabled business processes are dynamically integrated during implementation of the retail sale to perform, in the predefined sequential order of the components, all of the functions respectively associated with the components.

2. The system of claim 1, wherein the integration and dis-integration engine permits each business to dynamically, electronically and automatically enter and leave a component of said components in an on-demand manner which is transparent to the customer and which is based on predefined parameters that support revenue interests of both the consumer and each business that is entering or leaving the component.

3. The system of claim 2, wherein the components are visible to each business which enables each business to respond and deliver performance of the function associated with each component in the on-demand manner accordingly.

4. The system of claim 1, wherein the structure is embedded within a social network.

5. A method, said method comprising:
providing, by a server computer, a structure in which components of a plurality of components are integrated via dynamic application programming interface (API) integration, wherein the components are sequenced in a predefined sequential order, wherein a function to be performed is respectively associated with each component, wherein performance of all of the functions respectively associated with the components collectively implements a retail sale of a product to a customer in a de-centralized manner via each function respectively associated with each component being performed by a unique business of a plurality of businesses, wherein the businesses are independent and disparate with respect to each other, wherein the plurality of components are coordinated by server computer, and wherein performance, in the predefined sequential order of the components, of all of the functions respectively associated with the components implements the retail sale of the product to the customer;
coupling an integration and dis-integration engine to the server computer, wherein the server computer and the integration and dis-integration engine provide a technology environment that dynamically integrates technology enabled business processes of the businesses that dynamically, electronically and automatically enter and leave the components integrated in the structure provided by the server computer; and
dynamically integrating the technology enabled business processes during implementation of the retail sale to perform, in the predefined sequential order of the components, all of the functions respectively associated with the components.

6. The method of claim 5, said method further comprising:
permitting, by the integration and dis-integration engine, each business to dynamically, electronically and automatically enter and leave a component of said components in an on-demand manner which is transparent to the customer and which is based on pre-defined parameters that support revenue interests of both the consumer and each business that is entering or leaving the component.

7. The method of claim 6, wherein the components are visible to each business which enables each business to respond and deliver performance of the function associated with each component in the on-demand manner accordingly.

8. The method of claim 5, wherein the structure is embedded within a social network.

9. A computer program product, comprising one or more computer readable hardware storage devices having computer readable program code stored therein, said program code containing instructions executable by one or more processors to implement a method, said method comprising:
providing, by a server computer, a structure in which components of a plurality of components are integrated via dynamic application programming interface (API) integration, wherein the components are sequenced in a predefined sequential order, wherein a function to be performed is respectively associated with each component, wherein performance of all of the functions respectively associated with the components collectively implements a retail sale of a product to a customer in a de-centralized manner via each function respectively associated with each component being performed by a unique business of a plurality of businesses, wherein the businesses are independent and disparate with respect to each other, wherein the plurality of components are coordinated by server computer, and wherein performance, in the predefined sequential order of the components, of all of the functions respectively associated with the components implements the retail sale of the product to the customer;
coupling an integration and dis-integration engine to the server computer, wherein the server computer and the integration and dis-integration engine provide a technology environment that dynamically integrates technology enabled business processes of the businesses that dynamically, electronically and automatically enter and leave the components integrated in the structure provided by the server computer; and
dynamically integrating the technology enabled business processes during implementation of the retail sale to perform, in the predefined sequential order of the components, all of the functions respectively associated with the components.

10. The computer program product of claim 9, said method further comprising:
permitting, by the integration and dis-integration engine, each business to dynamically, electronically and automatically enter and leave a component of said components in an on-demand manner which is transparent to the customer and which is based on pre-defined parameters that support revenue interests of both the consumer and each business that is entering or leaving the component.

11. The computer program product of claim 10, wherein the components are visible to each business which enables each business to respond and deliver performance of the function associated with each component in the on-demand manner accordingly.

12. The computer program product of claim 9, wherein the structure is embedded within a social network.

* * * * *